(12) United States Patent
Yug et al.

(10) Patent No.: US 10,962,697 B2
(45) Date of Patent: Mar. 30, 2021

(54) POLARIZING LAYER HAVING DEFORMATION PARTS OF DIFFERING THERMAL DEFORMATION, AND DISPLAY DEVICE HAVING THE POLARIZING LAYER

(71) Applicant: Samsung Display Co., Ltd., Yongin-si (KR)

(72) Inventors: Geun Woo Yug, Yongin-si (KR); Jung Hwa You, Yongin-si (KR); Il Young Jeong, Yongin-si (KR); Soo Bum Park, Yongin-si (KR); Myeong Seok Jeong, Yongin-si (KR)

(73) Assignee: Samsung Display Co., Ltd.

( * ) Notice: Subject to any disclaimer, the term of this patent is extended or adjusted under 35 U.S.C. 154(b) by 320 days.

(21) Appl. No.: 15/715,752

(22) Filed: Sep. 26, 2017

(65) Prior Publication Data

US 2018/0313991 A1 Nov. 1, 2018

(30) Foreign Application Priority Data

Apr. 28, 2017 (KR) ........................ 10-2017-0055635

(51) Int. Cl.
*G02B 5/30* (2006.01)
*B23K 26/351* (2014.01)
*B23K 26/40* (2014.01)
*G02F 1/1335* (2006.01)
*G02F 1/1333* (2006.01)

(52) U.S. Cl.
CPC .......... *G02B 5/3025* (2013.01); *B23K 26/351* (2015.10); *B23K 26/40* (2013.01); *G02F 1/133528* (2013.01); *G02F 2001/133388* (2013.01)

(58) Field of Classification Search
CPC ...... B23K 26/16; B23K 26/351; B23K 26/36; B23K 26/362; B23K 26/38; B23K 26/40; B23K 26/402; B23K 26/50; G02B 5/30; G02B 5/3025; G02B 5/3033; G02B 5/3041; G02B 5/305; G02B 5/3075; G02F 2001/133388; G02F 1/133528
USPC ............. 264/1.34, 1.37; 349/96; 359/485.01, 359/485.03
See application file for complete search history.

(56) References Cited

U.S. PATENT DOCUMENTS

2002/0186469 A1* 12/2002 Kawazu ............... G02B 5/3033
                                                      359/485.01
2003/0189754 A1* 10/2003 Sugino ............. B29C 66/91921
                                                      359/485.01
2015/0277180 A1* 10/2015 Seo ...................... G02F 1/13306
                                                      349/58
2018/0102480 A1    4/2018 Yug
2018/0111869 A1*   4/2018 O'Connor ........... C03B 33/0222
2018/0122874 A1*   5/2018 Kim ........................ G02B 5/223

FOREIGN PATENT DOCUMENTS

KR    10-2013-0036903 A    4/2013
KR    10-2015-0045076 A    4/2015
KR    10-2018-0039223 A    4/2018

* cited by examiner

*Primary Examiner* — Ryan S Dunning
(74) *Attorney, Agent, or Firm* — Innovation Counsel LLP

(57) ABSTRACT

A polarizing layer includes a base film and a deformation part provided in an edge of the base film. The deformation part includes first deformation parts formed as the base film is deformed by heat, and at least one second deformation part provided between the first deformation parts adjacent to each other.

19 Claims, 17 Drawing Sheets

POLARIZING LAYER HAVING DEFORMATION PARTS OF DIFFERING THERMAL DEFORMATION, AND DISPLAY DEVICE HAVING THE POLARIZING LAYER

RELATED APPLICATIONS

The present application claims priority to Korean Patent Application No. 10-2017-0055635, filed on Apr. 28, 2017, in the Korean Intellectual Property Office, the entire disclosure of which is incorporated by reference herein.

BACKGROUND

1. Field

An aspect of the present disclosure relates to a polarizing layer, a display device with the same, and a fabricating method for the display device.

2. Description of the Related Art

In general, a display device such as a liquid crystal display device, an electrowetting display device, an electrophoretic display device, or an organic light emitting display device may include a display panel that displays an image and a polarizing layer that is integrated with the display panel or is provided on one surface of the display panel.

The polarizing layer can prevent the reflection of external light or improve the display quality of the display device.

SUMMARY

Embodiments provide a polarizing layer that allows particles generated when the polarizing layer is cut in a state in which the polarizing layer is attached to a display panel not to remain in a pad area of the display panel.

Embodiments also provide a display device having the polarizing layer.

Embodiments also provide a fabricating method for the display device having the polarizing layer.

According to an aspect of the present disclosure, there is provided a polarizing layer including: a base film; and a deformation part provided at an edge of the base film, wherein the deformation part includes first deformation parts formed as the base film is deformed by heat, and at least one second deformation part provided between the first deformation parts adjacent to each other.

In a direction parallel to the edge, a length of the second deformation part may be smaller than a length of the first deformation part.

The second deformation part may be a region formed as the base film is deformed by heat, and a thermal deformation degree of the second deformation part may be larger than a thermal deformation degree of the first deformation part.

In a direction vertical to the edge, a width of the second deformation part may be larger than a width of the first deformation part.

The second deformation part may have a shape protruding from the edge.

The base film may include two first sides facing each other, and two second sides facing each other, the second sides connecting the first sides to each other. The second deformation part may be provided at each of the second sides.

The base film may include: a linear polarizing layer; and a retardation layer provided on the linear polarizing layer.

The retardation layer may allow the phase of light incident thereinto to be moved by ¼λ.

According to another aspect of the present disclosure, there is provided a display device including: a display panel including a display area and a non-display area adjacent to the display area; and a polarizing layer provided on one surface of the display panel, the polarizing layer covering at least the display area, wherein the polarizing layer includes: a base film; and a deformation part provided at an edge of the base film, wherein the edge of the base film corresponds to an edge of the display panel, wherein the deformation part includes first deformation parts formed as the base film is deformed by heat, and at least one second deformation part provided between the first deformation parts adjacent to each other.

The base film may include: a linear polarizing layer; and a retardation layer provided between the linear polarizing layer and the display panel.

The non-display area may include pad areas respectively provided at both sides of the display area. The edge of the base film may include two first sides respectively adjacent to the pad areas, the first sides facing each other, and two second sides facing each other, the second sides connecting the first sides to each other. The second deformation part is provided at each of the second sides.

The second deformation part of one of the second sides may be identical to the second deformation part of the other of the second sides.

The second deformation part of one of the second sides may be different from the second deformation part of the other of the second sides.

The display device may further include a protective film provided on an other surface of the display panel.

According to another aspect of the present disclosure, there is provided a method for fabricating a display device. The method includes: preparing a display panel including a display area and a non-display area adjacent to the display area, the non-display area including a pad area; providing a polarizing layer covering the display panel except the pad area on one surface of the display panel, the polarizing layer including a base film; and cutting a region of the polarizing layer, which protrudes from an outside of the display panel, using a laser. The cutting includes at least a first cutting process and a second cutting process, wherein a first laser irradiation path of the first cutting process proceeds in a direction away from one point adjacent to the pad area in an edge of the base film along an edge of the display panel, starting with the one point. The first laser irradiation path is changed in a direction inclined with respect to the edge of the display panel at a first point corresponding to the edge of the display panel. A second laser irradiation path of the second cutting process proceeds along the edge of the display panel, starting with another point adjacent to the pad area in the edge of the base film. The second laser irradiation path is changed in a direction inclined with respect to the edge of the display panel at a second point adjacent to the first point.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
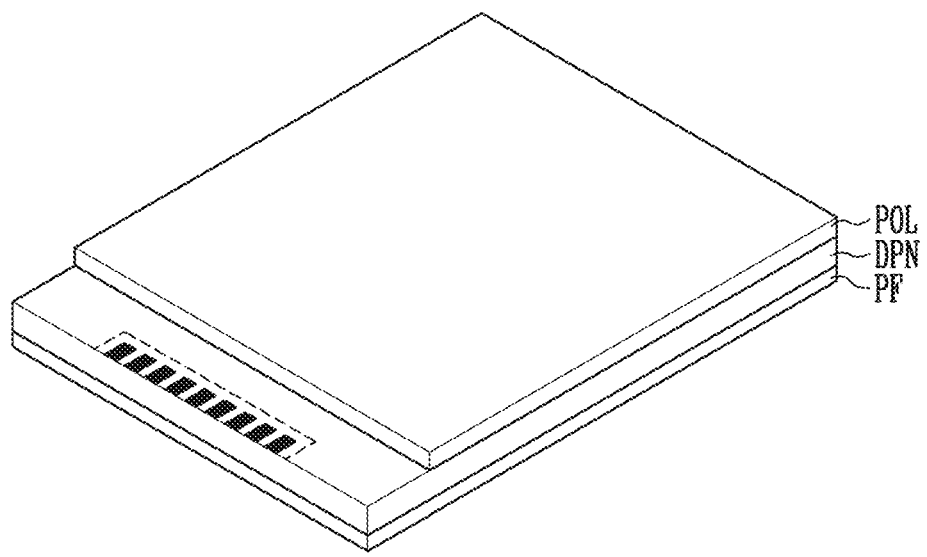
FIG. 1 is a perspective view illustrating a display device according to an embodiment of the present disclosure.

The present disclosure may apply to various changes and different shape, therefore only illustrated in detail are particular examples. However, the examples are not limited to certain shapes but apply to all the changes and equivalent materials and replacements. The drawings included are illustrated in a fashion where the figures are expanded for the better understanding.

Like numbers refer to like elements throughout. In the drawings, the thickness of certain lines, layers, components, elements or features may be exaggerated for clarity. It will be understood that although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. In addition, an expression that an element such as a layer, region, substrate or plate is placed "beneath" or "below" another element indicates not only a case where the element is placed "directly beneath" or "just below" the other element but also a case where a further element is interposed between the element and the other element.

Hereinafter, exemplary embodiments of the present disclosure will be described in detail with reference to the accompanying drawings.

Figure 2:
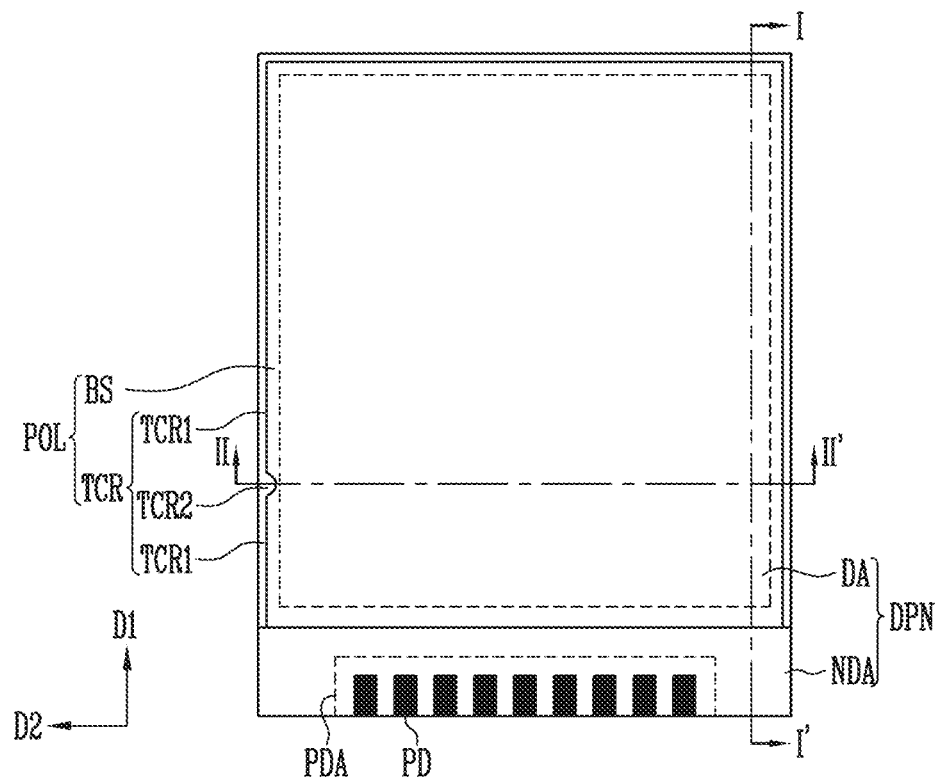
FIGS. 2 and 3 are plan views of the display device of FIG. 1.
Figure 3:
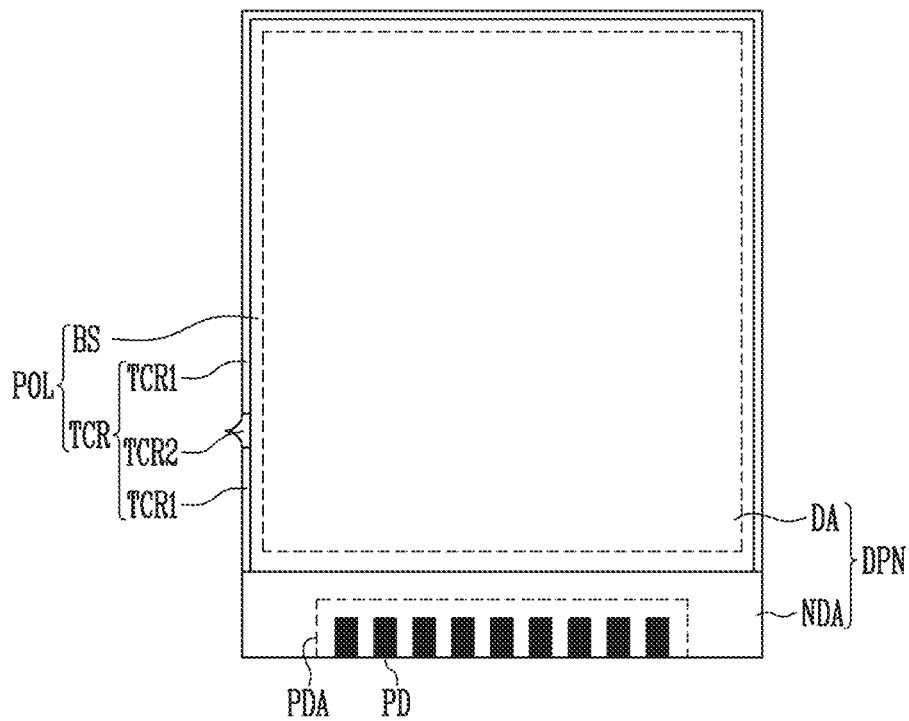
Figure 4:
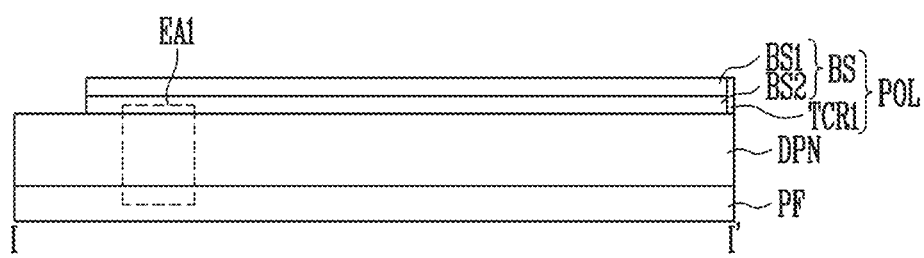
FIG. 4 is a sectional view taken along line I-I' of FIG. 2.
Figure 5:
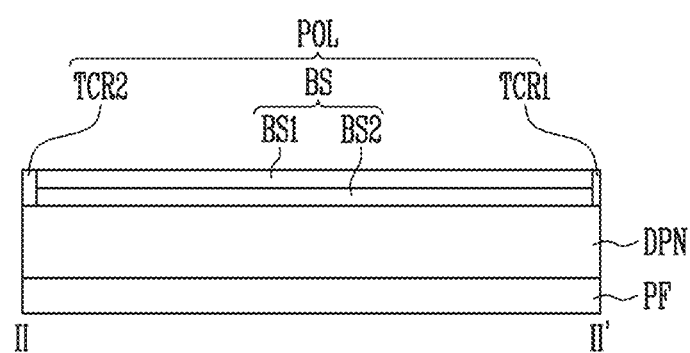
FIG. 5 is a sectional view taken along line II-II' of FIG. 2.
Figure 6:
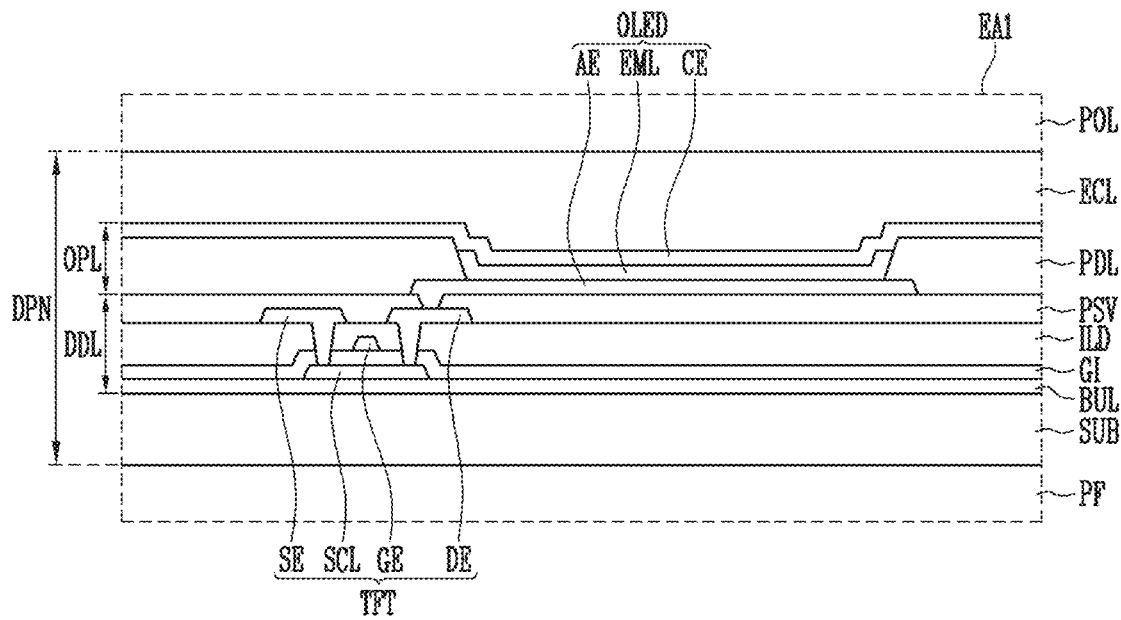
FIG. 6 is an enlarged view of area EA1 of FIG. 4.

FIG. 1 is a perspective view illustrating a display device according to an embodiment of the present disclosure. FIGS. 2 and 3 are plan views of the display device of FIG. 1. FIG. 4 is a sectional view taken along line I-I' of FIG. 2. FIG. 5 is a sectional view taken along line II-II' of FIG. 2. FIG. 6 is an enlarged view of area EA1 of FIG. 4.

Referring to FIGS. 1 to 6, the display device may include a display panel DPN, a protective film PF provided on one surface of the display panel DPN, and a polarizing layer POL provided on the other surface of the display panel DPN.

The display panel DPN may have various shapes. For example, the display panel DPN may have the shape of a closed-shape polygon including linear sides. The display panel DPN may also have the shape of a circle or ellipse including curved sides. The display panel DPN may also have the shape of a semicircle or semi-ellipse including linear and curved sides. In an embodiment of the present disclosure, when the display panel DPN has linear sides, at least some of corners of each of the shapes may be formed in a curve. For example, when the display panel DPN has a rectangular shape, a portion at which adjacent linear sides meet each other may be replaced with a curve having a predetermined curvature. That is, a vertex portion of the rectangular shape may be formed with a curved side having both adjacent ends respectively connected to two adjacent linear sides, the curved side having a predetermined curvature. The curvature may be differently set depending on positions. For example, the curvature may be changed depending on a position at which the curve is started, a length of the curve, etc. Hereinafter, for convenience of description, a case where the display panel DPN has a quadrangular shape is illustrated as an example.

The display panel DPN may display an image. The display panel DPN is not particularly limited. For example, a self-luminescent display panel such as an organic light emitting display panel (OLED panel) may be used as the display panel. In addition, a non-emissive display panel such as a liquid crystal display panel (LCD panel), an electrophoretic display panel (EDP panel), or an electrowetting display panel (EWD panel) may be used as the display panel DPN. When the non-emissive panel is used as the display panel DPN, the display device may include a backlight unit that supplies light to the display panel DPN. In this embodiment, a case where the OLED panel is used as the display panel DPN is described as an example.

The display panel DPN may include a display area DA and a non-display area NDA. The display area DA is an area in which an image is displayed, and may include a plurality of pixels. Each pixel may be any one of a red pixel, a green pixel, a blue pixel, and a white pixel, but this embodiment is not limited thereto. For example, the pixel may be any one of a magenta pixel, a cyan pixel, and a yellow pixel. Each of the pixels may include a display element OLED, sometime called a display device OLED. The display element OLED may be an organic light emitting element.

The non-display area NDA may be provided adjacent to the display area DA. For example, the non-display area NDA may be provided in a shape surrounding the display area DA. A pad area PDA may be provided at one side of the non-display area NDA. The pad area PDA may include a plurality of pads PD. The pads PD may be input/output terminals that allow the display panel DPN to be electrically connected to another electronic element, e.g., a flexible printed circuit board (FPC).

The display panel DPN may include a base substrate SUB, a driving layer DDL provided on the base substrate SUB, an optical layer OPL provided on the driving layer DDL, and an encapsulating layer ECL provided on the optical layer OPL.

The base substrate SUB may be divided into the display area DA and the non-display area NDA. Pixel areas in which the pixels are disposed may be provided in the display area DA of the base substrate SUB.

The base substrate SUB may include a transparent insulating material to allow light to be transmitted therethrough. Also, the base substrate SUB may be a rigid substrate or a flexible substrate. The rigid substrate may include a quartz substrate, a glass ceramic substrate, and a crystalline glass substrate. The flexible substrate may be a film substrate including a polymer organic material and a plastic substrate. For example, the flexible substrate may include one of polyethersulfone (PES), polyacrylate (PA), polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate (TAC), and cellulose acetate propionate (CAP). Also, the flexible substrate may include a fiber glass reinforced plastic (FRP).

The material applied to the base substrate SUB preferably has resistance (or heat resistance) against high processing temperature in a fabricating process of the display device.

The driving layer DDL is provided on the base substrate SUB, and may include at least one thin film transistor TFT provided in each pixel area. Also, the driving layer DDL may include a buffer layer BUL provided between the base substrate SUB and the thin film transistor TFT. The buffer layer BUL may include an inorganic insulating material. For example, the buffer layer BUL may include at least one of silicon oxide, silicon nitride, and silicon oxynitride. Also, the buffer layer BUL may have a single-layered or multi-layered structure. For example, the buffer layer BUL may have a single-layered structure including one of silicon oxide, silicon nitride, and silicon oxynitride. The buffer layer BUL may include a silicon oxide layer and a silicon nitride layer disposed on the silicon oxide layer. The buffer layer BUL may include three or more insulating layers that are sequentially stacked.

The buffer layer BUL may prevent impurities from being diffused from the base substrate SUB to the thin film transistor TFT. Also, the buffer layer BUL may planarize a surface of the base substrate SUB.

The thin film transistor TFT may be connected to a gate line (not shown) and a data line (not shown). The thin film transistor TFT may include a semiconductor layer SCL, a gate electrode GE, a source electrode SE, and a drain electrode DE.

The semiconductor layer SCL may be disposed on the buffer layer BUL. The semiconductor layer SCL may include one of amorphous Si, polycrystalline Si, oxide semiconductor, and organic semiconductor. In the semiconductor layer SCL, regions connected to the source electrode SE and the drain electrode DE may be source and drain regions into which impurities are doped or injected. A region between the source region and the drain region may be a channel region.

Meanwhile, although not shown in the drawings, when the semiconductor layer SCL includes an oxide semiconductor, a light blocking layer for blocking light incident into the semiconductor layer SCL may be disposed on the top or bottom of the semiconductor layer SCL.

A gate insulating layer GI may be disposed over the semiconductor layer SCL. The gate insulating layer GI covers the semiconductor layer SCL, and may insulate the semiconductor layer SCL and the gate electrode GE from each other. The gate insulating layer GI may include at least one of an organic insulating material and an inorganic insulating material. For example, the gate insulating layer GI may include at least one of silicon oxide and silicon nitride.

The gate electrode GE may be disposed on the gate insulating layer GI. The gate electrode GE may be connected to the gate line. The gate electrode GE may include a low-resistance conductive material, and overlap with the semiconductor layer SCL.

An interlayer insulating layer ILD may be disposed over the gate electrode GE. The interlayer insulating layer ILD may include at least one of an organic insulating material and an inorganic insulating material. For example, the interlayer insulating layer ILD may include at least one of silicon oxide and silicon nitride. The interlayer insulating layer ILD may insulate the source electrode SE and the drain electrode DE from the gate electrode GE.

Contact holes passing through the gate insulating layer GI and the interlayer insulating layer ILD may extend to and expose the source region and the drain region of the semiconductor layer therethrough.

The source electrode SE and the drain electrode DE may be disposed on the interlayer insulating layer ILD to be spaced apart from each other. The source electrode SE and the drain electrode DE may include a low-resistance conductive material. One end of the source electrode SE may be connected to the data line. The other end of the source electrode SE may be connected to the source region through one of the contact holes. One end of the drain electrode DE may be connected to the drain region through the other of the contact holes. The other end of the drain electrode DE may be connected to a display element OLED.

Meanwhile, in this embodiment, a case where the thin film transistor TFT is a thin film transistor having a top gate structure has been described as an example, but this embodiment is not limited thereto. For example, the thin film transistor TFT may be a thin film transistor having a bottom gate structure.

The driving layer DDL may further include a protective layer PSV provided over the thin film transistor TFT. The protective layer PSV may cover the thin film transistor TFT. A portion of the protective layer PSV may be removed to expose one of the source electrode SE and the drain electrode DE, e.g., the drain electrode DE therethrough.

The protective layer PSV may include at least one layer. For example, the protective layer PSV may include an inorganic protective layer and an organic protective layer disposed on the inorganic protective layer. The inorganic protective layer may include at least one of silicon oxide and silicon nitride. The organic protective layer may include one of acryl, polyimide (PI), polyamide (PA), and benzocyclobutene (BCB). Also, the organic protective layer may be a planarization layer that is transparent and flexible to reduce and planarize winding of a lower structure.

The optical layer OPL is provided on the protective layer PSV, and may include the display element OLED connected to the drain electrode DE.

The display element OLED may include a first electrode AE connected to the drain electrode DE, an emitting layer EML disposed on the first electrode AE, and a second electrode CE disposed on the emitting layer EML.

One of the first electrode AE and the second electrode CE may be an anode electrode, and the other of the first electrode AE and the second electrode CE may be a cathode electrode. For example, the first electrode AE may be an anode electrode, and the second electrode CE may be a cathode electrode.

In addition, at least one of the first electrode AE and the second electrode CE may be a transmissive electrode. For example, when the display element OLED is a bottom emission type organic light emitting element, the first electrode AE may be a transmissive electrode, and the second electrode CE may be a reflective electrode. When the display element OLED is a top emission type organic light emitting element, the first electrode AE may be a reflective electrode, and the second electrode CE may be a transmissive electrode. When the display element OLED is a double-sided emission type organic light emitting element, both of the first electrode AE and the second electrode CE may be transmissive electrodes. In this embodiment, a case where the display element OLED is a top emission type organic light emitting element, and the first electrode AE is an anode electrode is described as an example.

In each pixel area, the first electrode AE may be disposed on the protective layer PSV. The first electrode AE may include a reflective layer (not shown) capable of reflecting light and a transparent conductive layer (not shown) disposed on the top or bottom of the reflective layer. At least one of the reflective layer and the transparent conductive layer may be connected to the drain electrode DE.

The reflective layer may include a material capable of reflecting light. For example, the reflective layer may include at least one of aluminum (Al), silver (Ag), chromium (Cr), molybdenum (Mo), platinum (Pt), nickel (Ni), and any alloy thereof.

The transparent conductive layer may include transparent conductive oxide. For example, the transparent conductive layer may include at least one transparent conductive oxide selected from indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO).

A pixel defining layer PDL may be disposed over the first electrode AE. The pixel defining layer PDL is disposed between the pixel areas, and may expose the first electrode AE therethrough. Also, the pixel defining layer PDL may overlap with an edge portion of the first electrode AE. Therefore, the pixel defining layer PDL may allow a majority of a surface of the first electrode AE to be exposed therefrom.

The pixel defining layer PDL may include an organic insulating material.

For example, the pixel defining layer PDL may include at least one of polystyrene, polymethylmethacrylate (PMMA), polyacrylonitrile (PAN), polyamide (PA), polyimide (PI), polyarylether (PAE), heterocyclic polymer, parylene, epoxy, benzocyclobutene (BCB), siloxane based resin, and silane based resin.

The emitting layer EML may be disposed on the exposed surface of the first electrode AE. The emitting layer EML may have a multi-layered thin film structure including at least a light generation layer (LGL). For example, the emitting layer EML may include a hole injection layer (HIL) for injecting holes, a hole transport layer (HTL) having an excellent hole transporting property, the HTL for increasing the opportunity for holes and electrons to be re-combined by suppressing the movement of electrons that fail to be combined in the LGL, the LGL for emitting light through the re-combination of the injected electrons and holes, a hole blocking layer (HBL) for suppressing the movement of holes that fail to be combined in the LGL, an electron transport layer (ETL) smoothly transporting electrons to the LGL, and an electron transport layer (EIL) for injecting electrons.

The color of light generated in the LGL may be one of red, green, blue, and white, but this embodiment is not limited thereto. For example, the color of light generated in the LGL of the emitting layer EML may also be one of magenta, cyan, and yellow.

The HIL, the HTL, the HBL, the ETL, and the EIL may be common layers connected in adjacent light emitting regions.

The second electrode CE may be disposed on the emitting layer EML. The second electrode CE may be a semi-transmissive reflective layer. For example, the second electrode CE may be a thin metal layer having a thickness, through which light can be transmitted. The second electrode CE may allow a portion of the light emitted from the LGL to be transmitted therethrough, and reflect the rest of the light emitted from the LGL.

The second electrode CE may include a material having a low work function as compared with the transparent conductive layer. For example, the second electrode CE may include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), and any alloy thereof.

A portion of the light emitted from the emitting layer EML is not transmitted through the second electrode CE, and the light reflected from the second electrode CE may be again reflected from the reflective layer. That is, the light emitted from the emitting layer EML may resonate between the reflective layer and the second electrode CE. The light extraction efficiency of the display element OLED can be improved by the resonance of the light.

A distance between the reflective layer and the second electrode CE may be changed depending on a color of the light emitted from the LGL. That is, the distance between the reflective layer and the second electrode CE may be adjusted to correspond to a resonance distance, depending on the color of the light emitted from the LGL.

The encapsulating layer ECL may be provided over the second electrode CE. The encapsulating layer ECL covers the display element OLED and may prevent oxygen and moisture from penetrating into the display element OLED. The encapsulating layer ECL may include a plurality of insulating layers. For example, the encapsulating layer ECL may include a plurality of inorganic layers (not shown) and a plurality of organic layers (not shown). Also, the encapsulating layer ECL may include a plurality of encapsulating units including the inorganic layer and the organic layer disposed on the inorganic layer. The inorganic layer may include at least one of silicon oxide, silicon nitride, silicon oxynitride, aluminum oxide, titanium oxide, zirconium oxide, and tin oxide. The organic layer may include one of acryl, polyimide (PI), polyamide (PA), and benzocyclobutene (BCB).

The protective film PF may be provided on a surface of the base substrate SUB. In bending of the display panel DPN, the protective film PF may support the display panel DPN, to prevent the display panel DPN from being damaged. The protective film PF may include at least one of polyethylene terephthalate (PET), polyethylene naphthalate (PEN), polypropylene (PP), polycarbonate (PC), polystyrene (PS), polysulfone (PSul), polyethylene (PE), polyphthalamide (PPA), polyethersulfone (PES), polyarylate (PAR), and modified plyphenylene oxide (MPPO).

The polarizing layer POL may be provided on the encapsulating layer ECL. The polarizing layer POL may cover at least the display area DA. The polarizing layer POL may prevent the reflection of external light incident into the display panel DPN.

The polarizing layer POL may include a base film BS including a linear polarizing layer BS1 and a retardation layer BS2, and a deformation part TCR provided at an edge of the base film BS.

The base film BS may include the linear polarizing layer BS1 and the retardation layer BS2. Here, the retardation layer BS2 may be provided between the encapsulating layer ECL and the linear polarizing layer BS1.

The linear polarizing layer BS1 may polarize natural light or arbitrarily polarized light into a linearly polarized light in a specific direction, and reduce the reflection of the external light. A polarization axis of the linear polarizing layer BS1 may be inclined by 45 degrees with respect to that of the retardation layer BS2.

The retardation layer BS2 may allow the phase of light incident thereinto to be moved by ¼λ. That is, since the retardation layer BS2 allows the phase of light incident thereinto to be moved by ¼λ, the retardation layer BS2 may change linearly polarized light into circularly polarized light or change circularly polarized light into linearly polarized light.

The deformation part TCR is generated in a process of cutting the polarizing layer POL, and the cutting of the polarizing layer POL will be described in detail later. The deformation part TCR may have various shapes. For example, as shown in FIG. 2, the deformation part TCR may have first deformation parts TCR1 and at least one second deformation part TCR2. The second deformation part TCR2 may be provided between adjacent first deformation parts TCR1. The first deformation parts TCR1 and the second deformation part TCR2 may be regions formed as the base film BS is deformed by heat. Here, a thermal deformation degree of one of the first deformation parts TCR1 and the second deformation part TCR2 may be smaller than that of the other of the first deformation parts TCR1 and the second deformation part TCR2. For example, a thermal deformation degree of the first deformation parts TCR1 may be smaller than that of the second deformation part TCR2. In a direction D1 parallel to the edge, a length of one of the first deformation parts TCR1 and the second deformation part TCR2 may be different from that of the other of the first deformation parts TCR1 and the second deformation part TCR2. For example, a length of the second deformation part TCR2 may be smaller than that of the first deformation parts TCR1. In a direction D2 vertical to the edge, a width of one of the first deformation parts TCR1 and the second deformation part TCR2 may be different from that of the other of the first deformation parts TCR1 and the second deformation part TCR2. For example, a width of the second deformation part TCR2 may be larger than that of the first deformation parts TCR1.

In addition, as shown in FIG. 3, the deformation part TCR may include first deformation parts TCR1 formed as the base film BS is thermally deformed, and at least one second deformation part TCR2 protruding in a direction inclined with respect to the edge. The second deformation part TCR2 may be provided between adjacent first deformation parts TCR1. The second deformation part TCR2 may have a burr or tip shape.

Meanwhile, in FIGS. 2 and 3, a case where one second deformation part TCR2 is provided in the deformation part TCR has been described as an example, but the present disclosure is not limited thereto. For example, the deformation part TCR may include a plurality of second deformation parts TCR2. In this case, each of the second deformation parts TCR2 may be provided between adjacent first deformation parts TCR1 among the first deformation parts TCR1.

The polarizing layer POL can prevent the reflection of external light as follows.

First, the external light may be transmitted through the linear polarizing layer BS1. Here, the light transmitted through the linear polarizing layer BS1 may be linearly polarized light in which only a component vertical to the polarization axis of the linear polarizing layer BS1 exists.

The light transmitted through the linear polarizing layer BS1 may be transmitted through the retardation layer BS2. The light transmitted through the retardation layer BS2 may be circularly polarized light of which phase is moved by ¼λ by the retardation layer BS2.

The light transmitted through the retardation layer BS2 may be reflected from the display panel DPN. The light reflected from the display panel DPN (hereinafter, referred to as a "reflected light") may maintain the state of the circularly polarized light.

The reflected light may be again transmitted through the retardation layer BS2. The phase of the reflected light transmitted through the retardation layer BS2 may be moved by ¼λ by the retardation layer BS2. The reflected light reflected from the display panel DPN may be a linearly polarized light. Here, the reflected light transmitted through the retardation layer BS2 may be parallel to the polarization axis of the linear polarizing layer BS1. Therefore, the reflected light transmitted through the retardation layer BS2 is not transmitted through the linear polarizing layer BS1, and may be absorbed into the linear polarizing layer BS1.

Consequently, the polarizing layer POL can prevent the external light incident into the display device from being reflected. Thus, if the reflection of the external light is prevented by the polarizing layer POL, the contrast of the display device can be improved.

Hereinafter, a fabricating method for the display device shown in FIGS. 1 to 6 will be described with reference to FIGS. 7 to 12.

Figure 7:
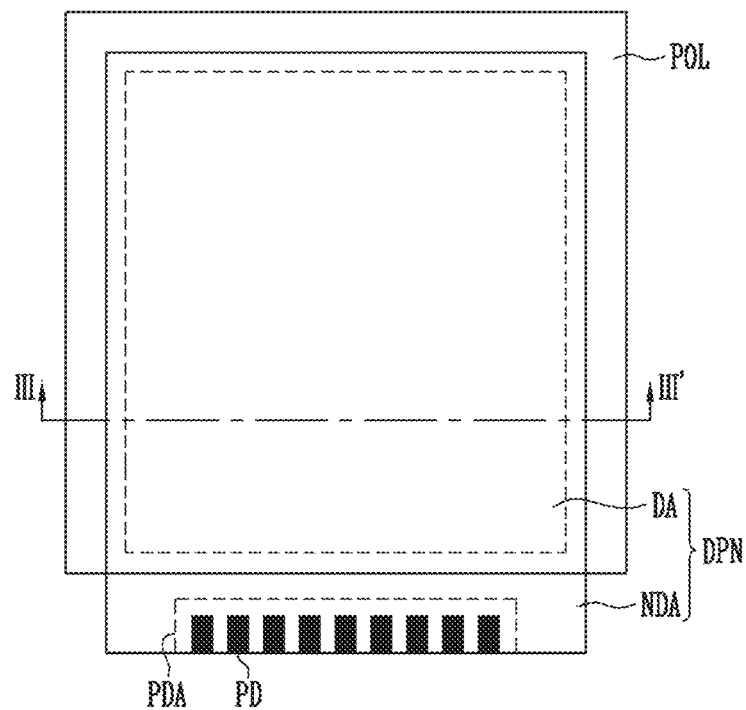
FIGS. 7, 8 and 9 are plan views illustrating a fabricating method for the display device shown in FIGS. 1 to 6.
Figure 8:
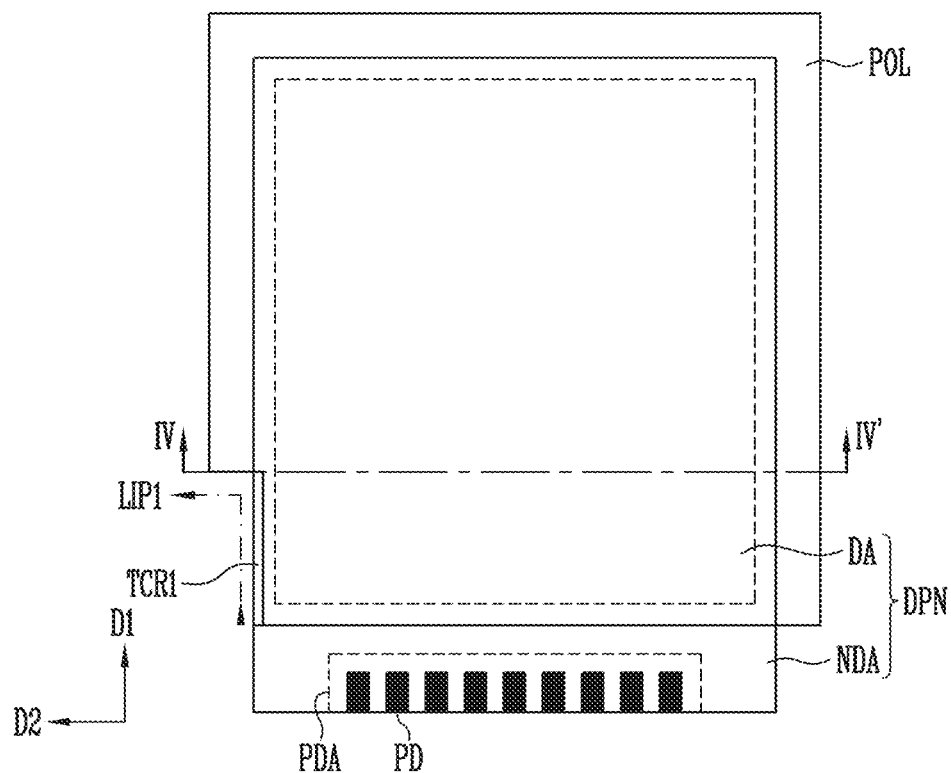
Figure 9:
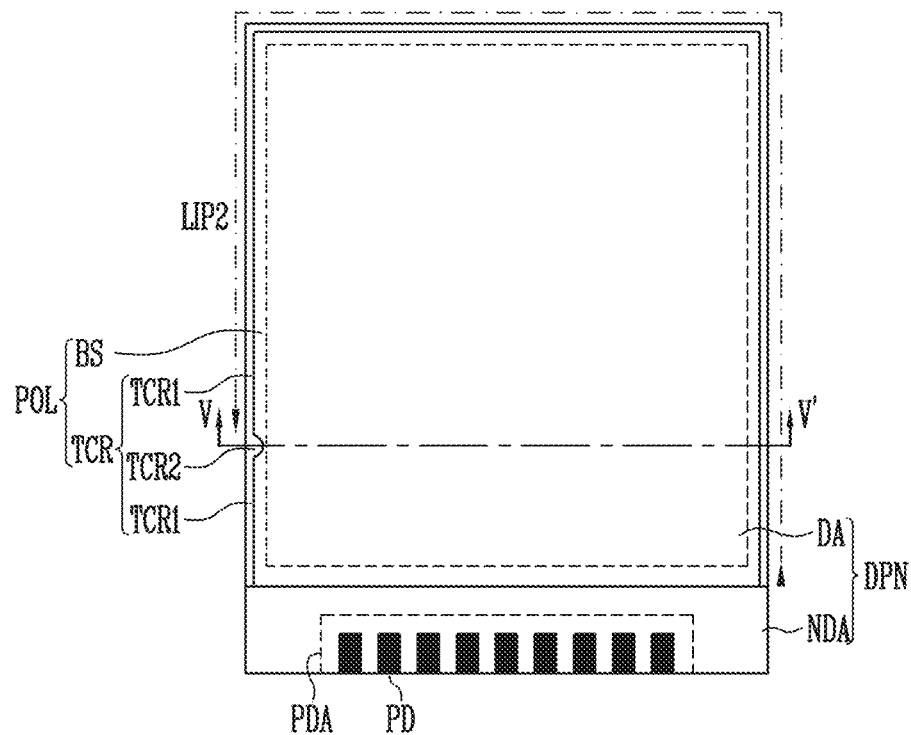
Figure 10:
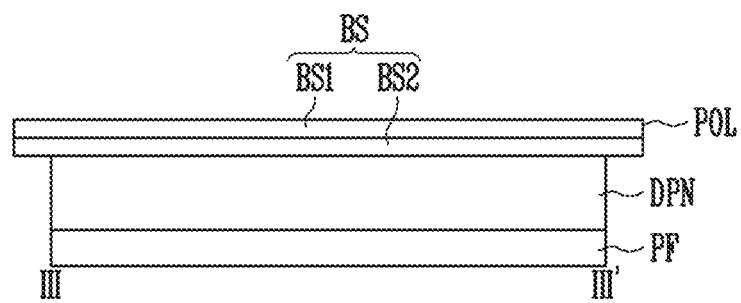
FIG. 10 is a sectional view taken along line III-III' of FIG. 7.
Figure 11:
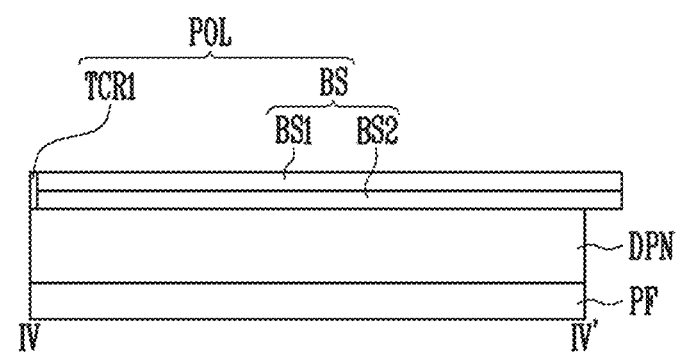
FIG. 11 is a sectional view taken along line IV-IV' of FIG. 8.
Figure 12:
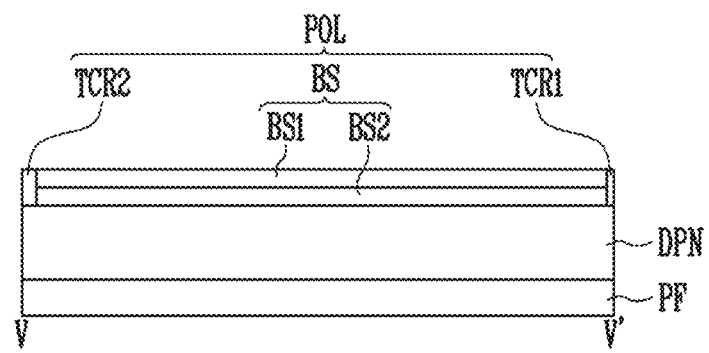
FIG. 12 is a sectional view taken along line V-V' of FIG. 9.

FIGS. 7 to 9 are plan views illustrating a fabricating method for the display device shown in FIGS. 1 to 6. FIG. 10 is a sectional view taken along line III-III' of FIG. 7. FIG. 11 is a sectional view taken along line IV-IV' of FIG. 8. FIG. 12 is a sectional view taken along line V-V of FIG. 9. In FIGS. 7 to 9, for convenience of description, the shape of the display device shown in FIG. 2 is illustrated as an example.

Referring to FIGS. 7 and 10, first, a display panel DPN is prepared. As shown in FIG. 3, the display panel DPN may include a display area DA and a non-display area NDA. The non-display area NDA may be provided adjacent to the display area DA. A pad area PDA including a plurality of pads PD may be provided at one side of the non-display area NDA.

In addition, as shown in FIG. 6, the display panel PDN may include a base substrate SUB, a driving layer DDL provided on the base substrate SUB, an optical layer OPL provided on the driving layer DDL, and an encapsulating layer ECL provided on the optical layer OPL.

The base substrate SUB may include a transparent insulating material to allow light to be transmitted therethrough. Also, the base substrate SUB may be a rigid substrate or a flexible substrate.

The driving layer DDL is provided on the base substrate SUB, and may include at least one thin film transistor TFT provided in each pixel area. Also, the driving layer DDL may include a buffer layer BUL provided between the base substrate SUB and the thin film transistor TFT. The driving layer DDL may further include a protective layer PSV provided over the thin film transistor TFT.

The optical layer OPL is provided on the protective layer PSV, and may include a display element OLED connected to a drain electrode DE of the thin film transistor TFT.

The display element OLED may include a first electrode AE connected to the drain electrode DE, an emitting layer EML disposed on the first electrode AE, and a second electrode CE disposed on the emitting layer EML.

The encapsulating layer ECL may be provided over the second electrode CE. The encapsulating layer ECL may prevent oxygen and moisture from penetrating into the display element OLED.

After the display panel DPN is prepared, a polarizing layer POL is disposed on the display panel DPN. The polarizing layer POL may be attached on the display panel DPN using a transparent adhesive (not shown).

The polarizing layer POL may be provided on the encapsulating layer ECL. The polarizing layer POL may prevent the reflection of external light incident into the display panel DPN. The polarizing layer POL may include a linear polarizing layer BS1 and a retardation layer BS2. Here, the retardation layer BS2 may be provided between the linear polarizing layer BS1 and the display panel DPN.

The polarizing layer POL may cover at least the display area DA. For example, the polarizing layer POL may cover the whole of the display panel DPN except the pad area PDA.

The polarizing layer POL may include a base film BS including the linear polarizing layer BS1 and the retardation layer BS2. Here, the retardation layer BS2 may be provided between the display panel DPN and the linear polarizing layer BS1.

Referring to FIGS. 8 and 11, after the polarizing layer POL is formed, a first cutting process is performed, thereby removing a portion of the polarizing layer POL. The first cutting process may be performed using a laser cutting device. Here, a cutting path of the polarizing layer POL through the first cutting process may correspond to a first laser irradiation path LIP1 through which the laser cutting device irradiates laser.

The first laser irradiation path LIP1 may proceed along an edge of the display panel DPN (hereinafter, referred to as a "display panel edge"), starting with one point adjacent to the pad area PDA in an edge of the polarizing layer POL. That is, in the first cutting process, at least a portion of the cutting path of the polarizing layer POL may be parallel to the display panel edge.

The first laser irradiation path LIP1 may be changed at an arbitrary first point corresponding to the display panel edge in a direction inclined with respect to the display panel edge, e.g., a direction D2 vertical to the display panel edge.

The first cutting process may be ended if the point at which the laser is irradiated reaches the outside of the polarizing layer POL.

When the polarizing layer POL is cut using the laser cutting device, the edge of the polarizing layer POL on which the first cutting process is performed may be thermally deformed by the laser. The thermally deformed region may be a first deformation part TCR1.

Meanwhile, particles of the polarizing layer POL may be generated during the first cutting process of cutting the polarizing layer POL using the laser. In the laser irradiation path, the particles may be moved to the front of the laser irradiation point. Therefore, the particles may not remain on the pad area PDA, particularly, the pads PD. In addition, the particles may be removed using an air blower or the like.

Referring to FIGS. 9 and 12, after the first cutting process is performed, a second cutting process is performed, thereby removing the rest of the polarizing layer POL protruding to the outside of the display panel DPN.

Like the first cutting process, the second cutting process may be performed using a laser cutting device.

The second cutting process may be performed along the display panel edge, starting with another point adjacent to the pad area PDA in the edge of the polarizing layer POL.

In addition, a second laser irradiation path LIP2 through which the laser cutting device irradiates laser may be changed at an arbitrary second point of the display panel edge in a direction inclined with respect to the display panel edge, e.g., a direction D2 vertical to the display panel edge.

The second cutting process may be ended if the point at which the laser is irradiated reaches the outside of the polarizing layer POL.

If the first point and the second point correspond to each other or are adjacent to each other, the polarizing layer POL may have a shape in which the region protruding to the outside of the display panel DPN is removed through the first cutting process and the second cutting process.

If the first point and the second point correspond to each other, a region adjacent to the first point or the second point in the edge of the polarizing layer POL, on which the second cutting process is completely performed, may have a laser irradiation amount relatively higher than that of the other region. Therefore, a thermal deformation degree of the region adjacent to the first point or the second point may be high as compared with the other region. In more detail, a deformation part TCR may be provided in the edge of the polarizing layer POL. The deformation part TCR may include first deformation parts TCR1 and at least one second deformation part TCR2. The first deformation parts TCR1 and the second deformation part TCR2 may be regions formed as the base film BS is deformed by heat. Here, a thermal deformation degree of one of the first deformation parts TCR1 and the second deformation part TCR2 may be smaller than that of the other of the first deformation parts TCR1 and the second deformation part TCR2. For example, the second deformation part TCR2 is a region adjacent to the first point or the second point, and the first deformation parts TCR1 may have a thermal deformation degree smaller than that of the second deformation part TCR2. The second deformation part TCR2 may be a region adjacent to the first point or the second point. That is, the second deformation part TCR2 may be provided between the first deformation parts TCR1.

In a direction D1 parallel to the edge of the polarizing layer POL, a length of one of the first deformation parts TCR1 and the second deformation part TCR2 may be different from that of the other of the first deformation parts TCR1 and the second deformation part TCR2. For example, a length of the second deformation part TCR2 may be less than that of the first deformation parts TCR1.

In a direction D2 vertical to the edge of the polarizing layer POL, a width of one of the first deformation parts TCR1 and the second deformation part TCR2 may be different from that of the other of the first deformation parts TCR1 and the second deformation part TCR2. For example, a width of the second deformation part TCR2 may be larger than that of the first deformation parts TCR1.

In addition, if the first point and the second point are disposed adjacent to each other but do not correspond to each other, the polarizing layer POL on which the first cutting process and the second cutting process are completely performed may have a shape in which a portion between the first point and the second point protrudes from the edge. In more detail, a deformation part TCR is provided in the edge of the polarizing layer POL. The deformation part TCR may include first deformation parts TCR1 formed as the base film BS is thermally deformed through the laser cutting, and a second deformation part TCR2 protruding in a direction inclined with respect to the edge between the first point and the second point. That is, the second deformation part TCR2 may be provided between adjacent first deformation parts TCR1. Also, the second deformation part TCR2, as shown in FIG. 3, may have a burr or tip shape.

Meanwhile, particles of the polarizing layer POL may be generated during the second cutting process of cutting the polarizing layer POL using the laser. In the laser irradiation path, the particles may be moved to the front of the laser irradiation point. Therefore, the particles may not remain on the pad area PDA, particularly, the pads PD. In addition, the particles may be removed using an air blower or the like.

After the second cutting process is performed, another electronic element such as an FPC is connected to the pads PD of the pad area PDA. Here, since any particle does not remain on the pads PD, a connection failure caused by the particle can be prevented when the electronic element is connected to the pads PD.

If the particles exist on the pads PD, some particles may remain on the pads PD even when the air blower or the like is used to remove the particles. This is because a bonding strength between the particles and the pads PD is larger than that between the particles and the polarizing layer POL. If the particles exist on the pads PD, a connection failure between the pads PD and the electronic element may occur.

Figure 13:
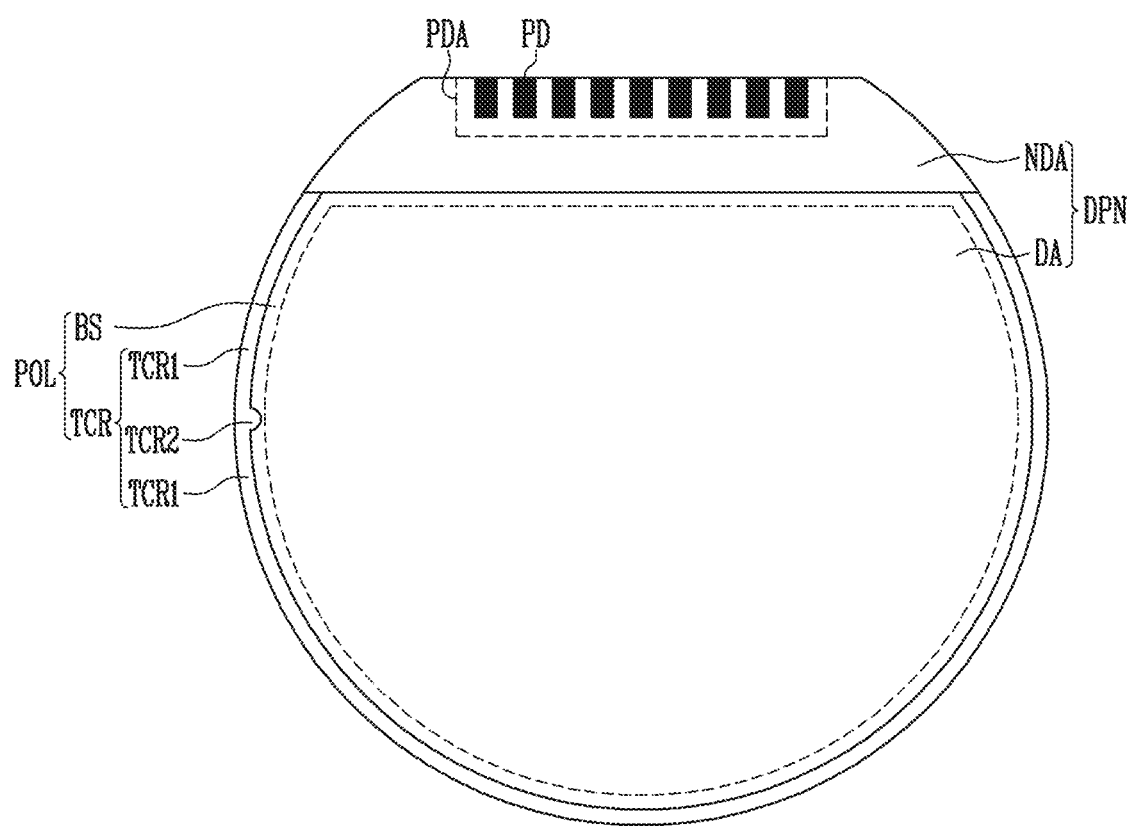
FIGS. 13 and 14 are plan views illustrating display devices according to embodiments of the present disclosure.
Figure 14:
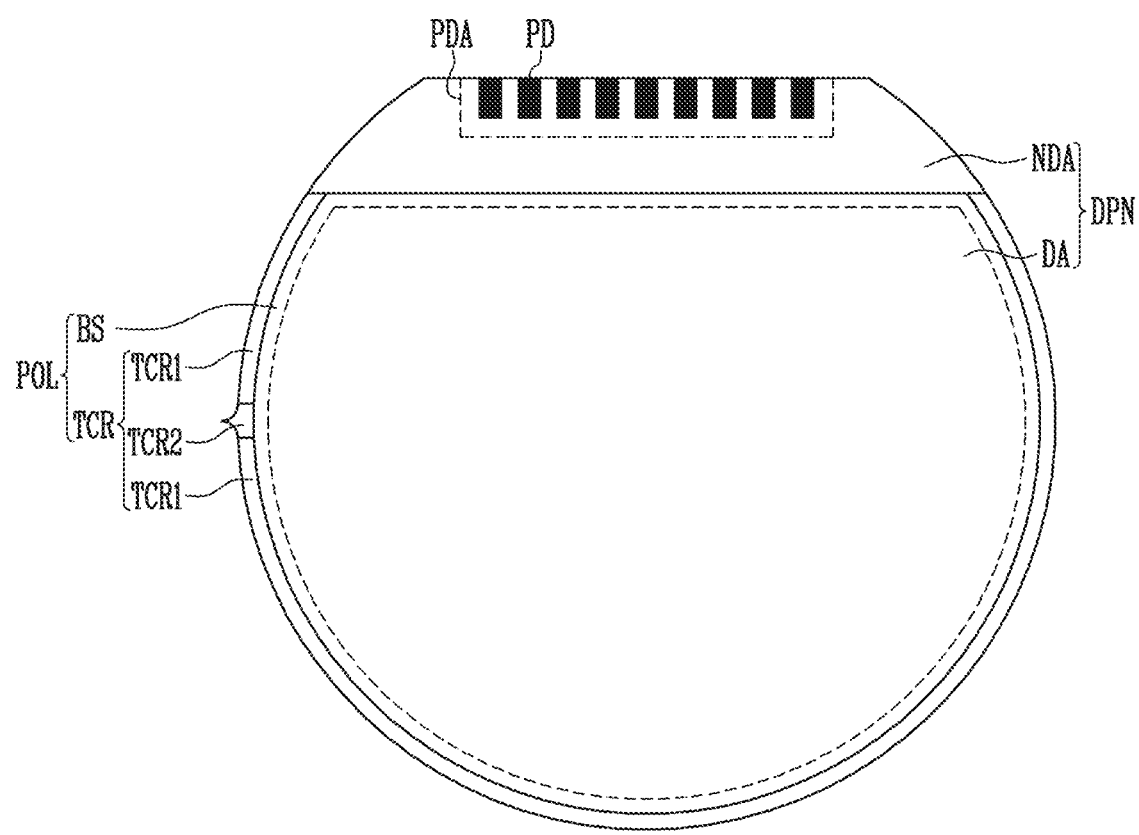

FIGS. 13 and 14 are plan views illustrating display devices according to embodiments of the present disclosure.

Referring to FIGS. 13 and 14, each display device may include a display panel DPN, a protective film (see "PF" of FIGS. 4 and 5) provided on one surface of the display panel DPN, and a polarizing layer POL provided on the other surface of the display panel DPN.

The display panel DPN may have a circular or elliptical shape. Also, the display panel DPN may have a shape in which a portion of the circular or elliptical shape is removed. For example, the display panel DPN may have a closed curve shape including linear and curved sides.

The display panel DPN may include a display area DA and a non-display area NDA. The non-display area NDA may be provided adjacent to the display area DA. For example, the non-display area NDA may be provided in a shape surrounding the display area DA. A pad area PDA may be provided at one side of the non-display area NDA.

The polarizing layer POL may be provided on the other surface of the display panel DPN, e.g., a surface on which an image of the display panel DPN is displayed. The polarizing layer POL may have a shape corresponding to the display panel DPN. For example, the polarizing layer POL may have a circular or elliptical shape, or have a closed curve shape including linear and curved sides. Also, the polarizing layer POL may cover at least the display area DA. The polarizing layer POL may prevent the reflection of external light incident into the display panel DPN.

The polarizing layer POL may include a base film BS including a linear polarizing layer BS1 and a retardation layer BS2, and a deformation part TCR provided at an edge of the base film BS.

The deformation part TCR may have various shapes. For example, as shown in FIG. 13, the deformation part TCR may include first deformation parts TCR1 and at least one second deformation part TCR2. The first deformation parts TCR1 and the second deformation part TCR2 may be regions formed as the base film BS is deformed by heat. Here, a thermal deformation degree of one of the first deformation parts TCR1 and the second deformation part TCR2 may be smaller than that of the other of the first deformation parts TCR1 and the second deformation part TCR2. A width of the second deformation part TCR2 may be larger than that of the first deformation parts TCR1. A length of the second deformation part TCR2 may be smaller than that of the first deformation parts TCR1.

In addition, as shown in FIG. 14, the deformation part TCR may include first deformation parts TCR1 formed as the base film BS is thermally deformed, and a second deformation part TCR2 provided between the first deformation parts TCR1, the second deformation part TCR2 protruding in a direction inclined with respect to an edge of the polarizing layer POL. Here, the second deformation part TCR2 may have a burr or tip shape.

Meanwhile, in FIGS. 13 and 14, a case where one second deformation part TCR2 is provided in the deformation part TCR is illustrated as an example, but the present disclosure is not limited thereto. For example, the deformation part TCR may include a plurality of second deformation parts TCR2. In this case, each of the second deformation parts TCR2 may be provided between adjacent first deformation parts TCR1 among the first deformation parts TCR.

FIGS. 15 to 20 are plan views illustrating display devices according to embodiments of the present disclosure.

Referring to FIGS. 15 to 20, each display device may include a display panel DPN, a protective film (see "PF" of FIGS. 4 and 5) provided on one surface of the display panel DPN, and a polarizing layer POL provided on the other surface of the display panel DPN.

The display panel DPN may have a closed curve shape. For example, the display panel DPN may have the shape of a closed-shape polygon including linear sides. The display panel DPN may also have the shape of a circle or ellipse including curved sides. The display panel DPN may also have the shape of a semicircle or semi-ellipse including linear and curved sides.

The display panel DPN may include a display area DA and a non-display area NDA. The non-display area NDA may be provided adjacent to the display area DA. For example, the non-display area NDA may be provided in a shape surrounding the display area DA. At least one pad area PDA including a plurality of pads PD may be provided in the non-display area NDA. For example, two pad areas PDA respectively disposed at both sides of the display area DA may be provided in the non-display area NDA.

The display area DA may include two first sides respectively adjacent to the pad areas PDA, and two second sides connecting the first sides to each other. Here, the first sides face each other, and the second sides also face each other. In addition, the first sides may be linear sides, and the second sides may be linear or curved sides.

The polarizing layer POL may be provided on the other surface of the display panel DPN, e.g., a surface on which an image of the display panel DPN is displayed. The polarizing layer POL may have a shape corresponding to the display panel DPN, particularly, the display area DA. For example, the polarizing layer POL may have a closed curve shape covering at least the display area DA.

The polarizing layer POL may include a base film BS including a linear polarizing layer BS1 and a retardation layer BS2, and deformation parts TCR provided at an edge of the base film BS, particularly, the second sides.

The deformation parts TCR may have various shapes. Hereinafter, shapes of the deformation parts TCR will be described.

Figure 15:
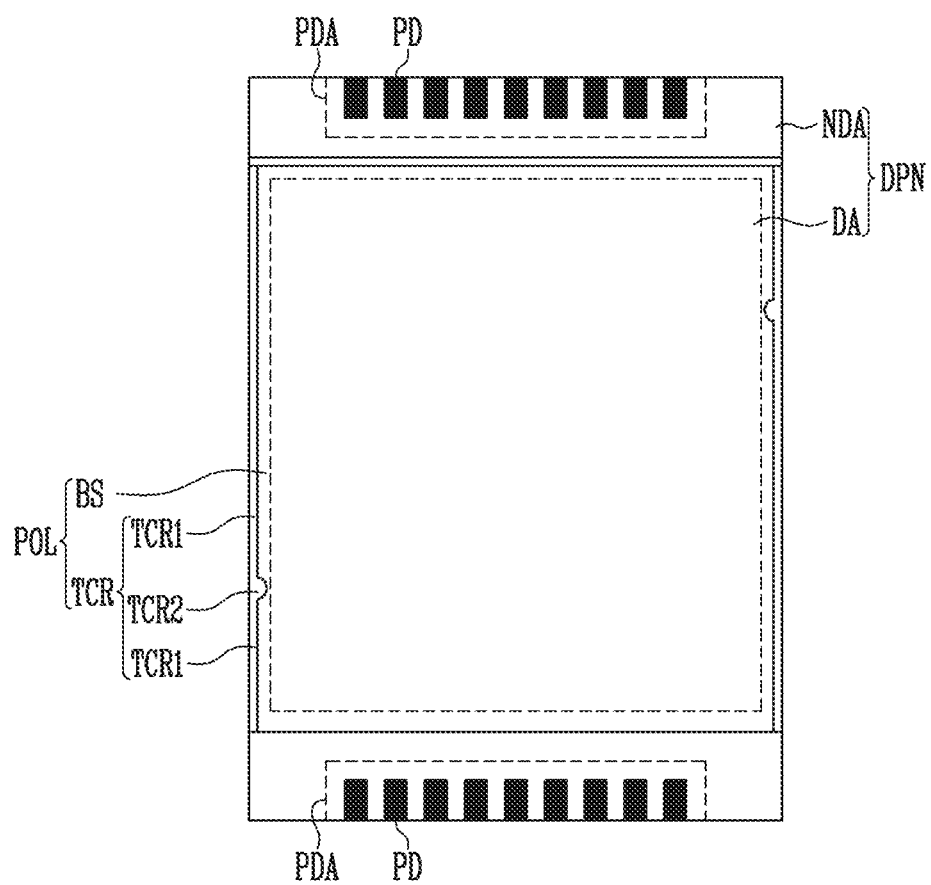
FIGS. 15, 16, 17, 18, 19, and 20 are plan views illustrating display devices according to embodiments of the present disclosure.
Figure 18:
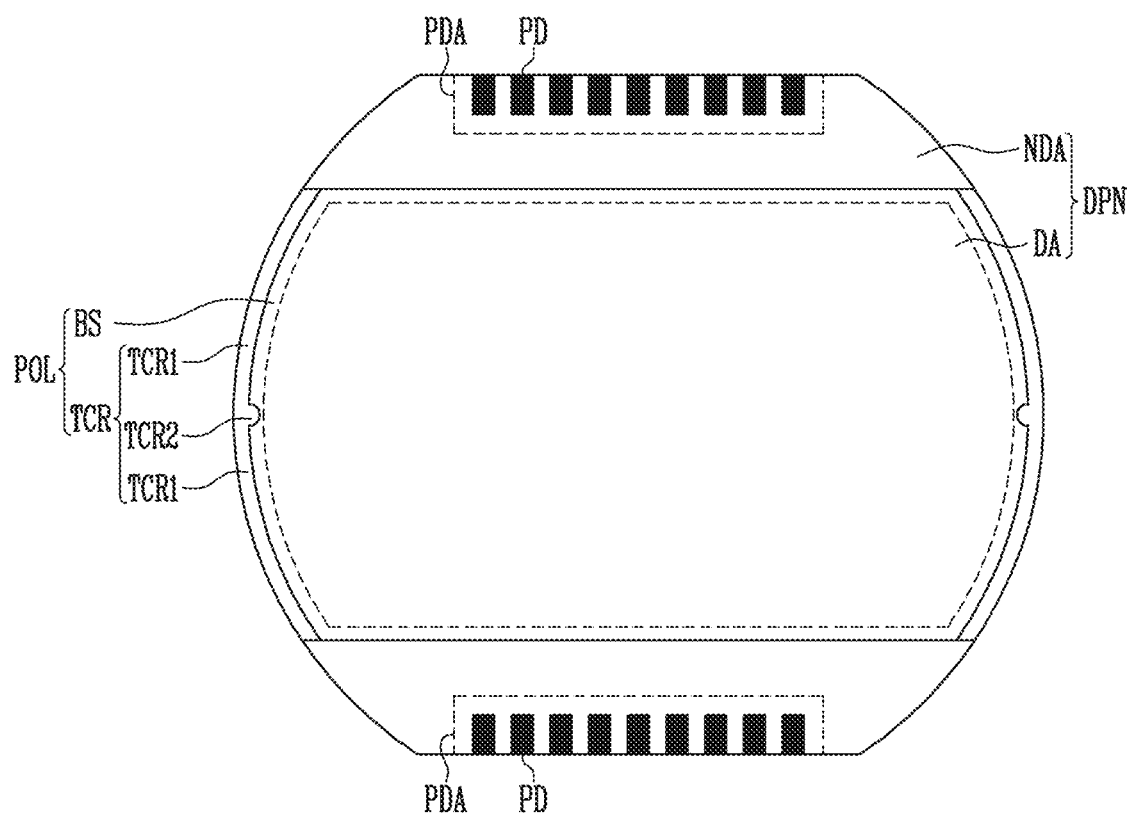

As shown in FIGS. 15 and 18, the deformation parts TCR may be regions formed as the base film BS is deformed by heat. Each of the deformation part TCR may include first deformation parts TCR1 and a second deformation part TCR2. Here, the second deformation part TCR2 may be provided between the first deformation parts TCR1. A thermal deformation degree of the first deformation parts TCR1 may be different from that of the second deformation part TCR2. Here, a thermal deformation degree of the first deformation parts TCR1 may be smaller than that of the second deformation part TCR2. A width of the second deformation part TCR2 may be larger than that of the first deformation parts TCR1. A length of the second deformation part TCR2 may be smaller than that of the first deformation parts TCR1.

Figure 16:
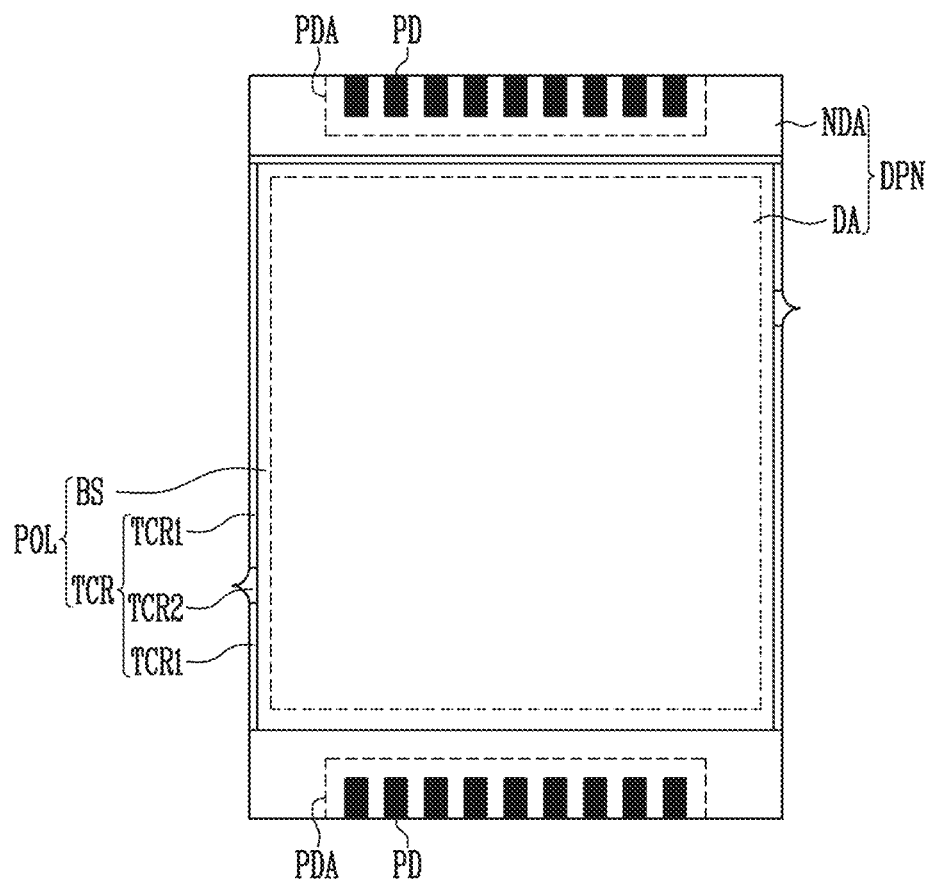
Figure 19:
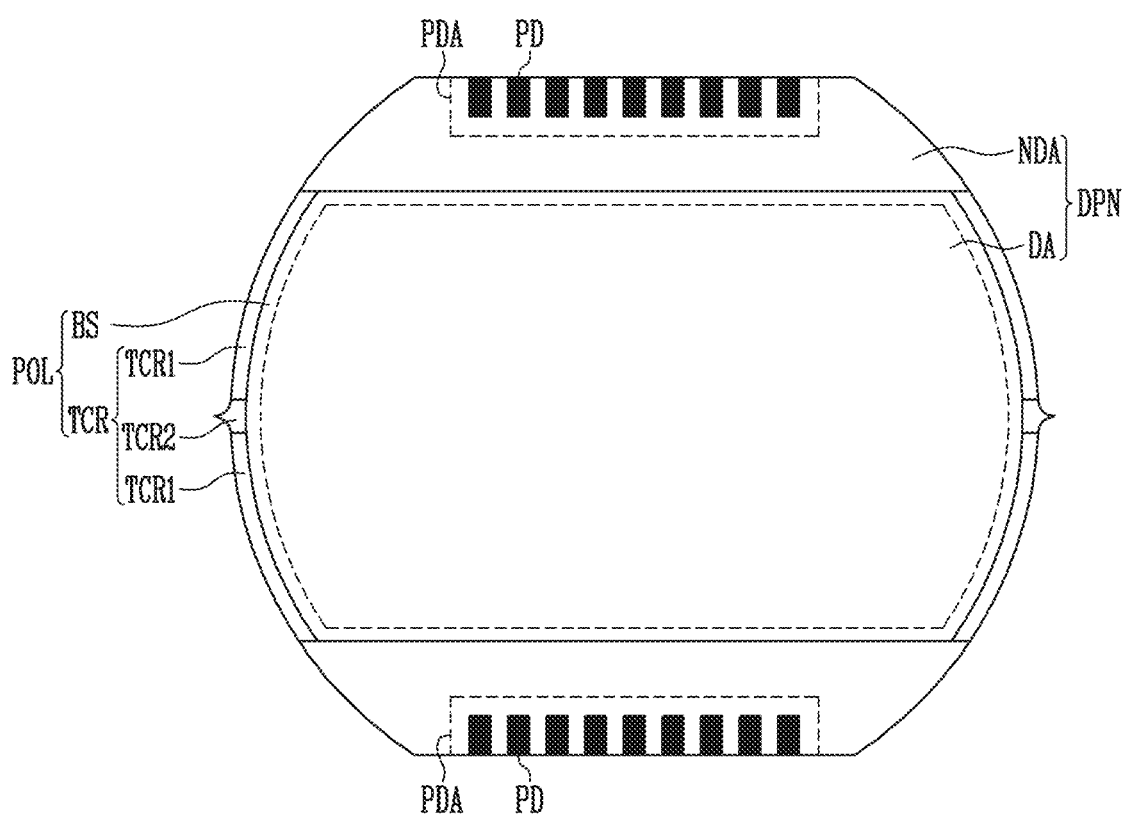

As shown in FIGS. 16 and 19, each of the deformation parts TCR may include first deformation parts TCR1 formed as the base film BS is thermally deformed, and a second deformation part TCR2 provided between the first deformation parts TCR1. The second deformation part TCR2 may protrude in a direction inclined with respect to the edge of the polarizing layer POL. For example, the second deformation part TCR2 may have a burr or tip shape.

Figure 17:
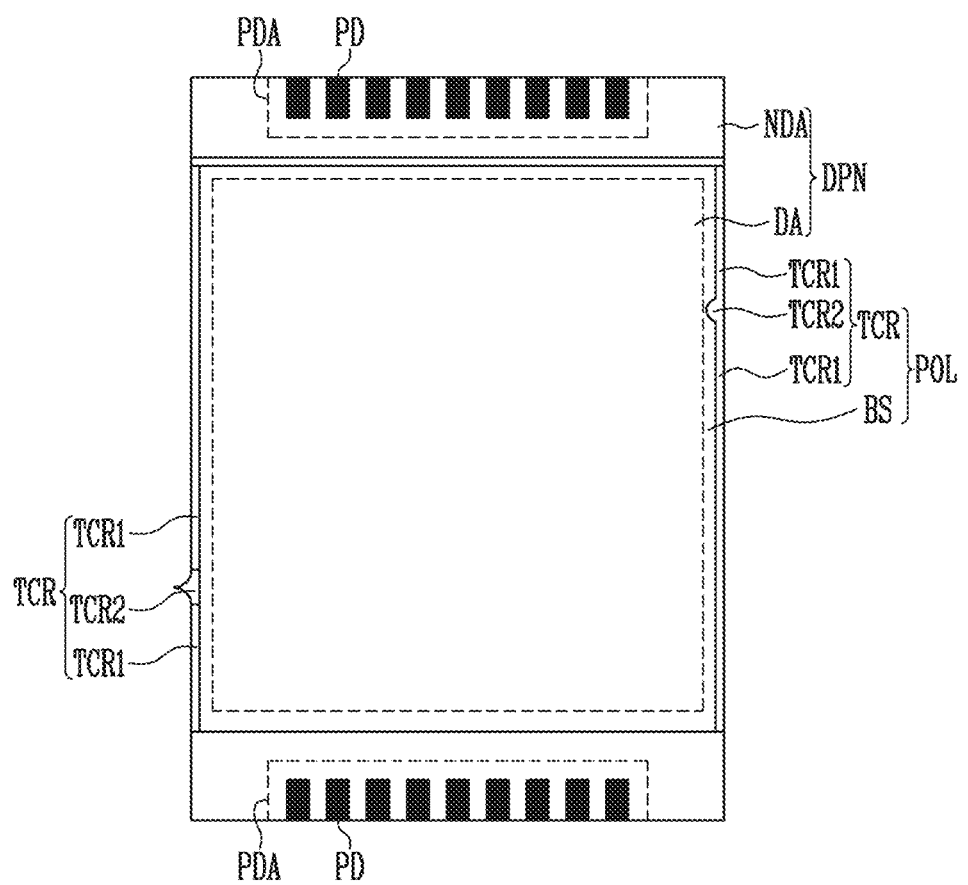
Figure 20:
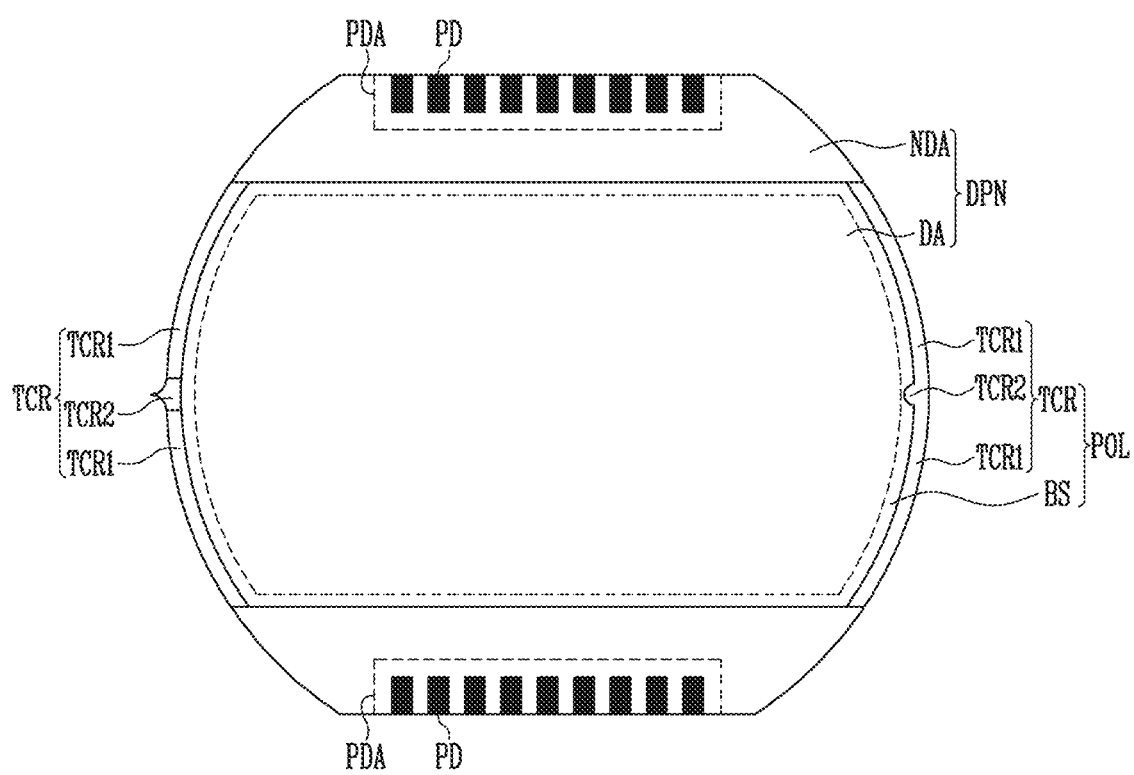

As shown in FIGS. 17 and 20, each of the deformation parts TCR may include first deformation parts TCR1 formed as the base film BS is thermally deformed, and a second deformation part TCR2 provided between the first deformation parts TCR1. Here, the second deformation part TCR2 may be provided between the first deformation parts TCR1. The second deformation part TCR2 of the deformation part TCR corresponding to one of the second sides may be different from the second deformation part TCR2 of the deformation part TCR corresponding to the other of the second sides. For example, the second deformation part TCR2 of the deformation part TCR corresponding to one of the second sides may be a thermally deformed region. In addition, the second deformation part TCR2 of the deformation part TCR corresponding to the other of the second sides may have a burr or tip shape protruding in a direction inclined with respect to the edge of the polarizing layer POL.

Meanwhile, in FIGS. 15 to 20, a case where one second deformation part TCR2 is provided in one deformation part TCR is illustrated as an example, but the present disclosure is not limited thereto. For example, the deformation part TCR may include a plurality of second deformation parts TCR2. In this case, each of the second deformation parts TCR2 may be provided between adjacent first deformation parts TCR1 among the first deformation parts TCR.

Figure 21:
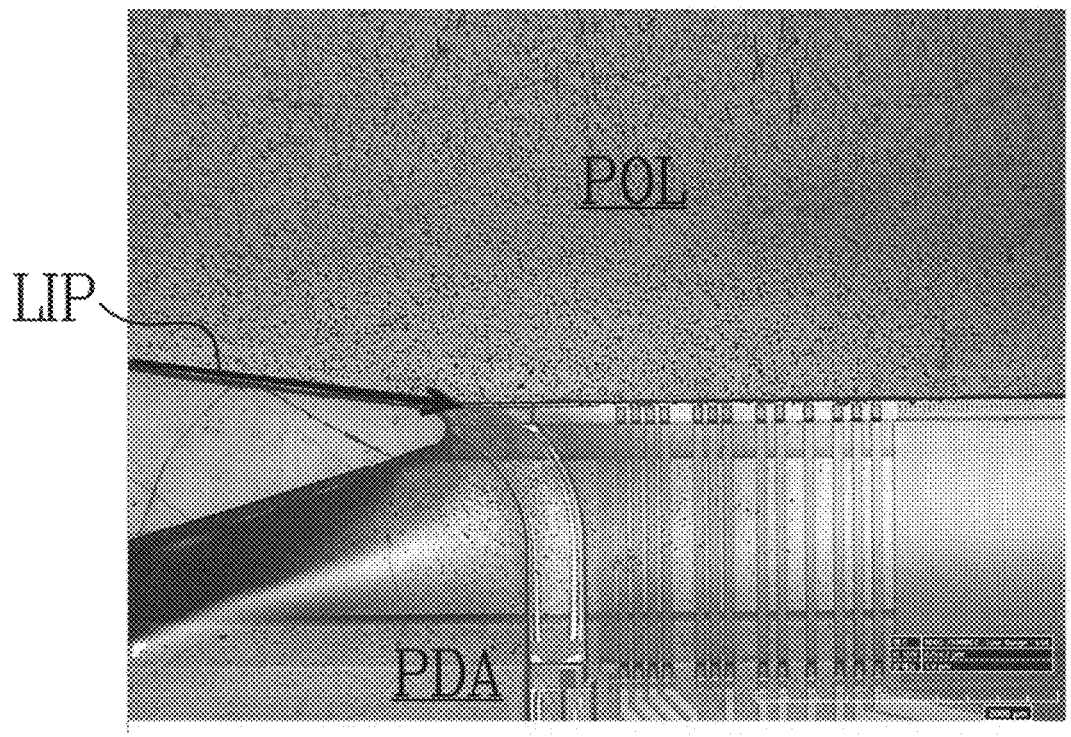
FIGS. 21 and 22 are images illustrating that particles remain in a pad area as laser cutting is performed on a polarizing layer.
Figure 22:
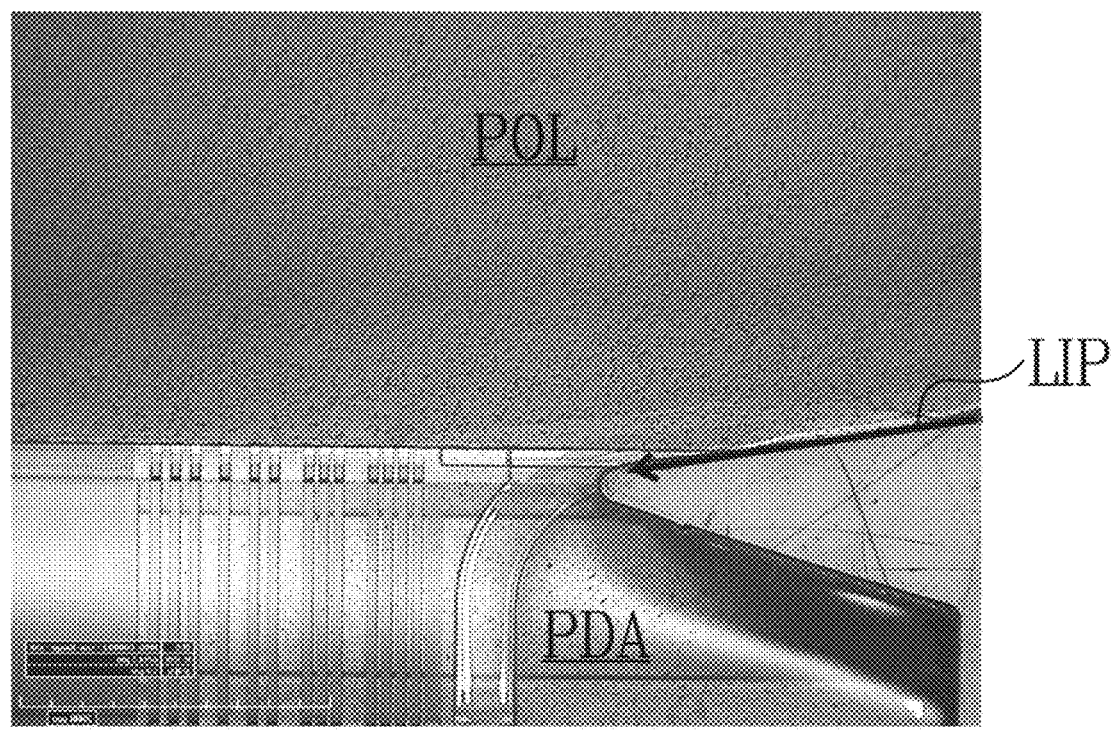
Figure 23:
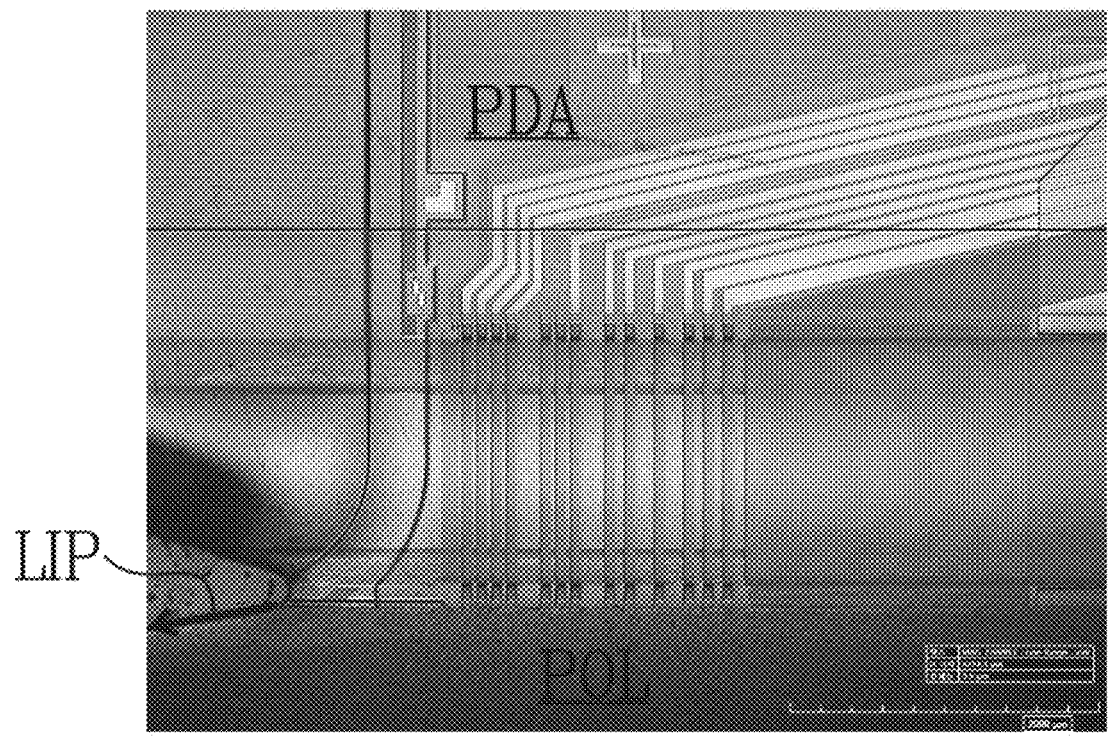
FIGS. 23 and 24 are images illustrating that a particle does not remain in the pad area as the laser cutting is performed on the polarizing layer in accordance with one embodiment.
Figure 24:
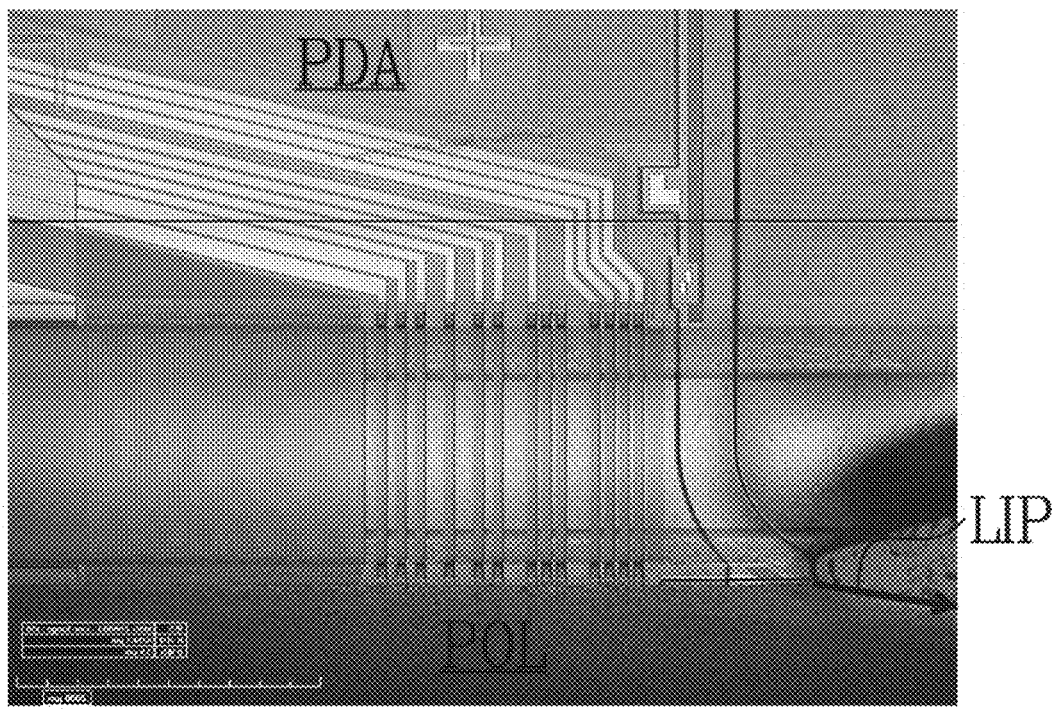

FIGS. 21 and 22 are images illustrating that particles remain in a pad area PDA as laser cutting is performed on a polarizing layer. FIGS. 23 and 24 are images illustrating that a particle does not remain in the pad area PDA as the laser cutting is performed on the polarizing layer in accordance with one embodiment.

Referring to FIGS. 21 to 24, a display device may include a display panel (see "DPN" of FIG. 1) and a polarizing layer POL provided on the display panel DPN.

The display panel DPN may include a display area (see "DA" of FIGS. 2 and 3) and a non-display area (see "NDA" of FIGS. 2 and 3), and a pad area PDA including a plurality of pads (see "PD" of FIGS. 2 and 3) may be provided at one side of the non-display area NDA. Here, the pads PD may be input/output terminals that allow the display panel DPN to be electrically connected to another electronic element, e.g., an FPC.

The polarizing layer POL may be cut using laser to expose the pad area PDA.

Meanwhile, in the cutting of the polarizing layer POL, particles may remain or may not remain in the pad area PDA, based on an irradiation path LIP of the laser irradiated onto the polarizing layer POL.

The particles may be generated in the process of cutting the polarizing layer POL using the laser. In the irradiation path LIP of the laser, the particles may be moved to the front of the irradiation path LIP of the laser at a point at which the laser is irradiated.

As shown in FIGS. 21 and 22, when the irradiation path LIP of the laser is ended as it proceeds in a direction of the pad area PDA, the particles may be moved in the direction of the pad area PDA. Therefore, the particles may remain on the pad area PDA. If the particles remain on the pad area PDA, a connection failure between the pads PD and the electronic element may occur due to the particles that remain on the pad area PDA.

In addition, as shown in FIGS. 23 and 24, if the irradiation path LIP of the laser proceeds in a direction distant (away) from the pad area PDA, starting with a point adjacent to the pad area PDA, the particles may be moved in the direction distant from the pad area PDA. Therefore, the particles may not remain on the pad area PDA. If the particles are not remaining on the pads PD, a connection failure between the pads PD and the electronic element, which occurs when the pads PD are connected to the electronic element, can be prevented due to the particles.

As described above, in the fabricating method for the display device, the polarizing layer is cut in the state in which the polarizing layer is attached to the display panel, and any particle generated in the cutting of the polarizing layer do not remain in the pad area of the display panel. Thus, when the pads of the pad area are connected to another electronic element such as an FPC, a connection failure can be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A polarizing layer comprising:
a base film on one surface of a display panel; and
a deformation part entirely provided at an entire edge of an outline of the base film corresponding to an outline of the display panel,
wherein the deformation part includes first deformation parts formed as the base film is deformed by heat, and at least one second deformation part provided between the first deformation parts adjacent to each other,
wherein each of the first deformation parts is formed continuously at the entire edge of the outline of the base film except the at least one second deformation part, and
wherein the second deformation part is a region formed as the base film is deformed by heat, and a thermal deformation degree of the second deformation part is larger than a thermal deformation degree of the at least one of the first deformation parts.

2. The polarizing layer of claim 1, wherein, in a direction parallel to the edge, a length of the second deformation part is smaller than a length of at least one of the first deformation parts.

3. The polarizing layer of claim 2, wherein, in a direction relative to the edge, a width of the second deformation part is larger than a width of the at least one of the first deformation parts.

4. The polarizing layer of claim 2, wherein the second deformation part has a shape protruding from the edge.

5. The polarizing layer of claim 2, wherein the base film includes two first sides facing each other, and two second sides facing each other, the second sides connecting the first sides to each other,
wherein the second deformation part is provided at each of the second sides.

6. The polarizing layer of claim 1, wherein the base film includes:
a linear polarizing layer; and
a retardation layer provided on the linear polarizing layer.

7. The polarizing layer of claim 6, wherein the retardation layer allows the phase of light incident thereinto to be moved by ¼λ.

8. A display device comprising:
a display panel including a display area and a non-display area adjacent to the display area; and
a polarizing layer provided on one surface of the display panel, the polarizing layer covering at least the display area,
wherein the polarizing layer includes:
a base film; and
a deformation part entirely provided at an entire edge of an outline of the base film corresponding to an outline of the display panel,
wherein the deformation part includes first deformation parts formed as the base film is deformed by heat, and at least one second deformation part provided between the first deformation parts adjacent to each other,
wherein each of the first deformation parts is formed continuously at the entire edge of the outline of the base film except the at least one second deformation part, and
wherein the second deformation part is a region formed as the base film is deformed by heat, and a thermal deformation degree of the second deformation part is larger than a thermal deformation degree of the at least one of the first deformation parts.

9. The display device of claim 8, wherein the base film includes:
a linear polarizing layer; and
a retardation layer provided between the linear polarizing layer and the display panel.

10. The display device of claim 8, wherein, in a direction parallel to the edge of the base film, a length of the second deformation part is smaller than a length of at least one of the first deformation parts.

11. The display device of claim 10, wherein, in a direction relative to the edge of the base film, a width of the second deformation part is larger than a width of the at least one of the first deformation parts.

12. The display device of claim 10, wherein the second deformation part has a shape protruding from the edge of the base film.

13. The display device of claim 8, wherein the non-display area includes pad areas respectively provided at two sides of the display area,
wherein the edge of the base film includes two first sides respectively adjacent to the pad areas, the first sides facing each other, and two second sides facing each other, the second sides connecting the first sides to each other,
wherein the second deformation part is provided at each of the second sides.

14. The display device of claim 13, wherein the second deformation part of one of the second sides is identical to the second deformation part of the other of the second sides.

15. The display device of claim 14, wherein, in a direction parallel to the edge of the base film, a length of the second deformation part is smaller than a length of the at least one of the first deformation parts, and a width of the second deformation part is larger than a width of the at least one of the first deformation parts.

16. The display device of claim 14, wherein the second deformation part has a shape protruding from the edge of the base film.

17. The display device of claim 13, wherein the second deformation part of one of the second sides is different from the second deformation part of the other of the second sides.

18. The display device of claim 17,
wherein the second deformation part of the other at least one of the second sides has a shape protruding in a direction inclined with respect to the edge of the base film.

19. The display device of claim 8, further comprising a protective film provided on an other surface of the display panel.

* * * * *